L. D. RETTSTATT.
NUT LOCK.
APPLICATION FILED JULY 9, 1913.
1,085,821.
Patented Feb. 3, 1914.
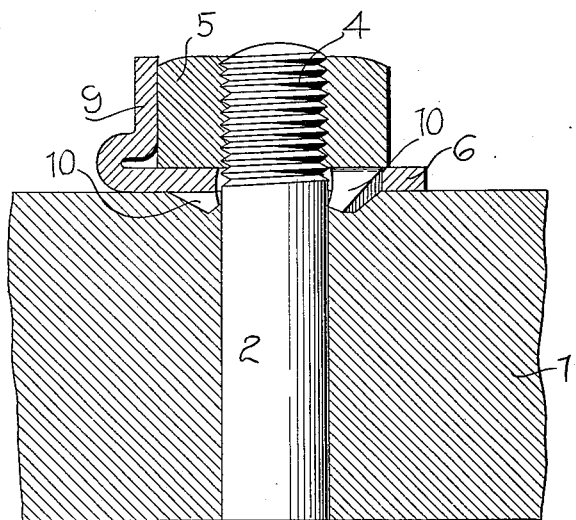
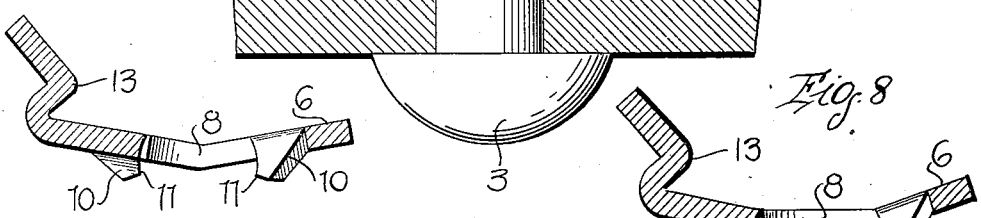
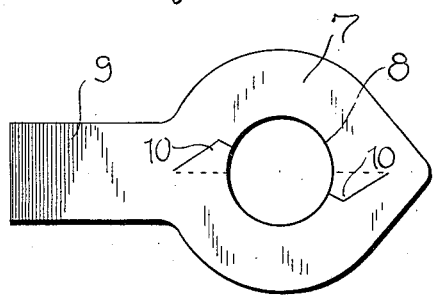
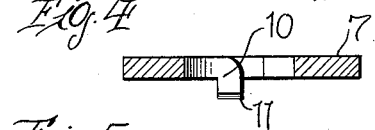
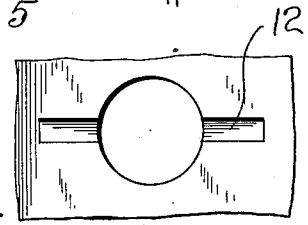
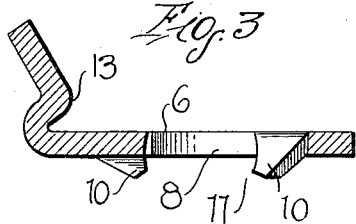
Witnesses
Robert M. Sutphen
A. J. Hind
Inventor
L. D. RETTSTATT
By Watson E. Coleman
Attorney

UNITED STATES PATENT OFFICE.

LUCIEN D. RETTSTATT, OF SMITHTON, PENNSYLVANIA.

NUT-LOCK.

1,085,821.   Specification of Letters Patent.   Patented Feb. 3, 1914.

Application filed July 9, 1913. Serial No. 778,195.

*To all whom it may concern:*

Be it known that I, LUCIEN D. RETTSTATT, a citizen of the United States, residing at Smithton, in the county of Westmoreland and State of Pennsylvania, have invented certain new and useful Improvements in Nut-Locks, of which the following is a specification, reference being had to the accompanying drawings.

This invention relates to new and useful improvements in nut locks and more particularly to a locking washer, the object of the invention being to provide a locking washer adapted for application to the threaded end of a bolt and engage the nut to hold the same against turning movement thereon.

Another object of the invention is the provision of a nut lock of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1 is a longitudinal sectional view illustrating the application of my improved locking washer; Fig. 2 is a top plan view of the washer; Fig. 3 is a longitudinal sectional view; Fig. 4 is a transverse sectional view; Fig. 5 is a plan view illustrating the opening and the recess in the work to which my improved locking washer is to be applied; and Fig. 6 is a vertical sectional view; Fig. 7 is a longitudinal sectional view of the locking washer illustrating a modified form. Fig. 8 is a longitudinal sectional view of the locking washer illustrating still another modified form of the invention.

Referring more particularly to the drawings, 1 indicates the work upon which my improved nut lock is to be applied. This work may be in the form of metal, wood or any other material through which the bolt 2 is adapted to be inserted, said bolt being provided upon one end with a suitable head 3 and formed at its other end with the screw threads 4. Removably engaged with the threaded end of the bolt is a nut 5 which is adapted to be screwed down upon the bolt to securely retain the locking washer 6 in its operative position.

The locking washer 6 comprises a substantially circular body 7 provided with a central opening 8 and formed integral with the body at one side thereof is the locking tongue 9. The washer 6 is provided with the engaging members 10 which are cut from the body 7 at diametrically opposite points around the opening 8 and bent downwardly, as clearly illustrated in Fig. 4. The engaging members 10 are provided with a sharp edge 11 which, when the washer is used upon a wooden surface will engage therewith and prevent turning movement of the washer. As illustrated in Fig. 5, the material, when of metal, is provided upon opposite sides of the opening with tapering grooves 12 adapted to receive the engaging members 10 and prevent any rotary movement of the washer.

The locking tongue 9, as shown in Fig. 3, is disposed in an inoperative position and after the nut 5 has been threaded upon the bolt 2 and turned home, the outer end of the tongue will be hammered inwardly to engage one of the faces of the nut. From this it will be seen that by having the rounded surface 13 of the tongue 9 engaging with one of the faces of the nut, it will tend to pull the washer 6 slightly toward the tongue, this movement forcing the opposed engaging member against the body of the bolt 2, the sharpened edge of the engaging member cutting into the bolt sufficiently so that it will absolutely prevent turning movement of either the bolt or the washer. It will be readily apparent that by having the locking tongue 9 rigidly engaged with one of the side faces of the nut, it will securely retain the nut upon the threaded end of the bolt and prevent any turning movement thereof.

In Fig. 7, I have illustrated a modified form of the invention wherein the body of the washer is bent at a point central of the opening 8, thus forcing the engaging points 11 farther apart so that when the washer is placed upon the bolt and the nut screwed downward thereon, the force of the nut pressing downwardly upon the washer will straighten the same and at the same time force the engaging members 11 toward each other so that they will engage the periphery of the bolt to prevent any turning movement whatever of the bolt. It will also be apparent that by having the washer in this form, the nut can be more readily screwed down on to the bolt and not receive any interference with the rounded portion 13 of the locking tongue 9.

While I have shown and described my improved locking washer adapted for application to the threaded nut of the bolt to securely lock the same against rotary movement, it will be readily apparent that my improved washer is adapted for application to the headed end of the bolt to prevent the same from turning in the hole which is provided for it. This application of the locking washer is preferably provided for machine bolts and the like.

From the above it will be readily apparent that my improved washer may be quickly and readily applied to the end of the bolt and when the nut, adapted for engagement upon the bolt, has been screwed home, the locking tongue 9 which is adapted for engagement with the nut will securely hold the same against any turning movement whatever.

In Fig. 8, I have illustrated still another modified form of the invention wherein the locking washer is bent upon opposite sides of the center of the opening 8, as clearly illustrated so that when the washer is applied to the nut and screwed home on the bolt, the upwardly bent portions will be forced downwardly engaging the sharpened points 11 with the periphery of the bolt which will assist in preventing rotary movement of the washer and the bolt. It will also be seen that after the nut has been screwed home and the washer arranged in its locking position, the tongue 9 which is normally disposed in an angular position relative to the position of the washer, will then be forced inwardly against one of the side portions of the nut to securely hold the same against turning movement. It will be seen from the foregoing that by having the locking washer bent upon opposite sides of the opening 8, the sharpened tongues 11 will be more readily forced into engagement with the bolt.

From the above description taken in connection with the accompanying drawings, it will be readily apparent that I have provided a simple and durable locking washer which can be quickly and easily applied to the threaded end of the bolt and after the nut has been turned home upon the bolt, the locking tongue of the washer may be quickly and readily bent to an operative position to securely hold the nut against any turning movement whatever. It will also be apparent that my device is extremely simple in construction and can be manufactured at a comparatively low cost.

While I have shown and described the preferred form of my invention it will be obvious that various changes in the details of construction and in the proportions may be resorted to for successfully carrying my invention into practice without sacrificing any of the novel features as defined by the appended claims.

What I claim is:—

1. A device of the class described including a bolt having a nut threaded upon one end, a washer interposed between the nut and the work upon which the bolt is used, engaging members formed integral with the washer and arranged upon diametrically opposite sides of the center, said engaging members being provided with sharpened edges adapted to engage in the work to prevent rotary movement of the washer, a locking tongue formed integral with the washer and normally disposed at an angle with respect thereto, said locking tongue being provided adjacent its inner end with a rounded surface adapted for engagement with one of the faces of the nut which, when the locking tongue is bent inwardly toward the faces of the nut will tend to force the locking washer toward the tongue and engage one of the sharpened edges of the opposed engaging member with the bolt, thus preventing any turning movement of the nut.

2. A device of the class described including a bolt having a nut threaded upon one end thereof, a washer interposed between the nut and the work upon which the bolt is used, said washer being provided with a central bent portion, engaging members formed upon the washer and arranged at diametrically opposite points upon opposite sides of the center, said engaging members being each provided with a sharpened edge which is adapted to be forced into engagement with the bolt upon the downward movement of the nut by the straightening of said bent portion and a locking tongue adapted to be bent upwardly at right angles to the body of the washer and engage one of the faces of the nut, as and for the purpose set forth.

In testimony whereof I hereunto affix my signature in the presence of two witnesses.

LUCIEN D. RETTSTATT.

Witnesses:
W. G. RETTSTATT,
RUSSELL H. RHOADES.

Copies of this patent may be obtained for five cents each, by addressing the "Commissioner of Patents, Washington, D. C."